(12) United States Patent
Satomi et al.

(10) Patent No.: US 8,879,125 B2
(45) Date of Patent: Nov. 4, 2014

(54) IMAGE PROCESSING APPARATUS AND IMAGE FORMING APPARATUS (71) Applicant: KYOCERA Document Solutions Inc., Osaka (JP)

(72) Inventors: Seiki Satomi, Osaka (JP); Toshiaki Mutsuo, Osaka (JP)

(73) Assignee: KYOCERA Document Solutions Inc. (JP)

( * ) Notice: Subject to any disclaimer, the term of this patent is extended or adjusted under 35 U.S.C. 154(b) by 17 days.

(21) Appl. No.: 13/922,124

(22) Filed: Jun. 19, 2013

(65) Prior Publication Data

US 2013/0342875 A1 Dec. 26, 2013

(30) Foreign Application Priority Data

Jun. 25, 2012 (JP) ................................ 2012-142113

(51) Int. Cl.
*H04N 1/407* (2006.01)
*H04N 1/409* (2006.01)
*H04N 1/393* (2006.01)

(52) U.S. Cl.
CPC ........... *H04N 1/4092* (2013.01); *H04N 1/3935* (2013.01)
USPC .......... 358/3.27; 358/2.1; 358/3.15; 382/197; 382/254; 382/298

(58) Field of Classification Search
CPC .................... G06T 5/002; G06T 2207/20192; G06K 2215/0002; H04N 1/3935; H04N 1/4092; H04N 1/58
See application file for complete search history.

(56) References Cited

U.S. PATENT DOCUMENTS

| | | | | |
|---|---|---|---|---|
| 5,832,141 A * | 11/1998 | Ishida et al. | | 382/298 |
| 5,933,528 A * | 8/1999 | Katayama et al. | | 382/197 |
| 6,289,136 B1 * | 9/2001 | Oshino et al. | | 382/298 |
| 6,298,156 B1 * | 10/2001 | Ishida et al. | | 382/197 |
| 6,885,383 B2 * | 4/2005 | Muresan et al. | | 345/611 |
| 7,230,742 B1 * | 6/2007 | Kuwata et al. | | 358/3.15 |
| 8,150,189 B2 * | 4/2012 | Shimodaira | | 382/254 |
| 8,326,083 B2 * | 12/2012 | Ono et al. | | 382/284 |
| 2003/0095723 A1 * | 5/2003 | Ishizaka et al. | | 382/298 |

FOREIGN PATENT DOCUMENTS

| | | |
|---|---|---|
| DE | 19506792 | 9/1996 |
| JP | H04-329483 | 11/1992 |
| JP | 2005-039802 | 2/2005 |

* cited by examiner

*Primary Examiner* — Dung Tran (57) ABSTRACT

An image processing apparatus of the present disclosure includes: a step detecting unit which detects a first step pixel and a second step pixel in the binary image and step directions of the first step pixel and the second step pixel; and an enlargement processing unit which inverts pixel values of pixels from the first pixel value to the second pixel value in a pixel area corresponding to the first step pixel in the enlarged image, and inverts pixel values of pixels from the second pixel value to the first pixel value in a pixel area corresponding to the second step pixel. The pixels of which pixel values are inverted are located at positions corresponding to its step direction. The number of the pixels of which pixel values are inverted corresponds to its step length in the binary image.

8 Claims, 12 Drawing Sheets

FIG. 2A
STEP LENGTH = 1

FIG. 2D

FIG. 2B
STEP LENGTH = 2

FIG. 2C
STEP LENGTH = 3

IMAGE PROCESSING APPARATUS AND IMAGE FORMING APPARATUS

CROSS-REFERENCE TO RELATED APPLICATIONS

This application relates to and claims priority rights from a Japanese Patent Application No. 2012-142113, filed on Jun. 25, 2012, the entire disclosures of which are hereby incorporated by reference herein.

BACKGROUND

1. Field of the Invention

The present disclosure relates to an image processing apparatus and an image forming apparatus.

2. Description of the Related Art

Various techniques are proposed for smoothing a step part between two edges in an enlarged image when a binary image is enlarged.

An image processing apparatus identifies whether three black pixels forms either L shape or inverted L shape in a 2×2 pixel area in an original binary image, and if an edge extends from the L shape or the inverted L shape, determines pixel values of a pixel area (i.e. a 4×4 pixel area in an enlarged image) generated from the 2×2 pixel area by enlargement of twice on the basis of a length of the edge.

SUMMARY

An image processing apparatus according to an aspect of the present disclosure includes: a step detecting unit configured to detect a first step pixel and a second step pixel in the binary image and step directions of the first step pixel and the second step pixel, the first step pixel forming a step of a first pixel value, the second step pixel forming a step of a second pixel value that is an inverted value of the first pixel value; and an enlargement processing unit configured to invert pixel values of pixels from the first pixel value to the second pixel value in a pixel area corresponding to the first step pixel in the enlarged image, and invert pixel values of pixels from the second pixel value to the first pixel value in a pixel area corresponding to the second step pixel, the pixels of which pixel values are inverted from the first pixel value to the second pixel value being located at positions corresponding to the step direction, the number of the pixels of which pixel values are inverted from the first pixel value to the second pixel value corresponding to the number of pixels that have same pixel values and are continuously arranged in line from the first pixel value in the binary image, the pixels of which pixel values are inverted from the second pixel value to the first pixel value being located at positions corresponding to the step direction, the number of the pixels of which pixel values are inverted from the second pixel value to the first pixel value corresponding to the number of pixels that have same pixel values and are continuously arranged in line from the second pixel value in the binary image.

Therefore, when a binary image is enlarged, smoothing is properly performed for respective ones of both a pixel area with one value among binary values and a pixel area with the other value among binary values.

An image forming apparatus according to an aspect of the present disclosure includes an image processing apparatus configured to generate an enlarged image from a binary image with smoothing a neighborhood of a step between in two edges. The image processing apparatus includes: a step detecting unit configured to detect a first step pixel and a second step pixel in the binary image and step directions of the first step pixel and the second step pixel, the first step pixel forming a step of a first pixel value, the second step pixel forming a step of a second pixel value that is an inverted value of the first pixel value; and an enlargement processing unit configured to invert pixel values of pixels from the first pixel value to the second pixel value in a pixel area corresponding to the first step pixel in the enlarged image, and invert pixel values of pixels from the second pixel value to the first pixel value in a pixel area corresponding to the second step pixel, the pixels of which pixel values are inverted from the first pixel value to the second pixel value being located at positions corresponding to the step direction, the number of the pixels of which pixel values are inverted from the first pixel value to the second pixel value corresponding to the number of pixels that have same pixel values and are continuously arranged in line from the first pixel value in the binary image, the pixels of which pixel values are inverted from the second pixel value to the first pixel value being located at positions corresponding to the step direction, the number of the pixels of which pixel values are inverted from the second pixel value to the first pixel value corresponding to the number of pixels that have same pixel values and are continuously arranged in line from the second pixel value in the binary image.

These and other objects, features and advantages of the present invention will become more apparent upon reading of the following detailed description along with the accompanied drawings.

DETAILED DESCRIPTION

Hereinafter, an embodiment according to an aspect of the present disclosure will be explained with reference to drawings.

Embodiment 1

Figure 1:
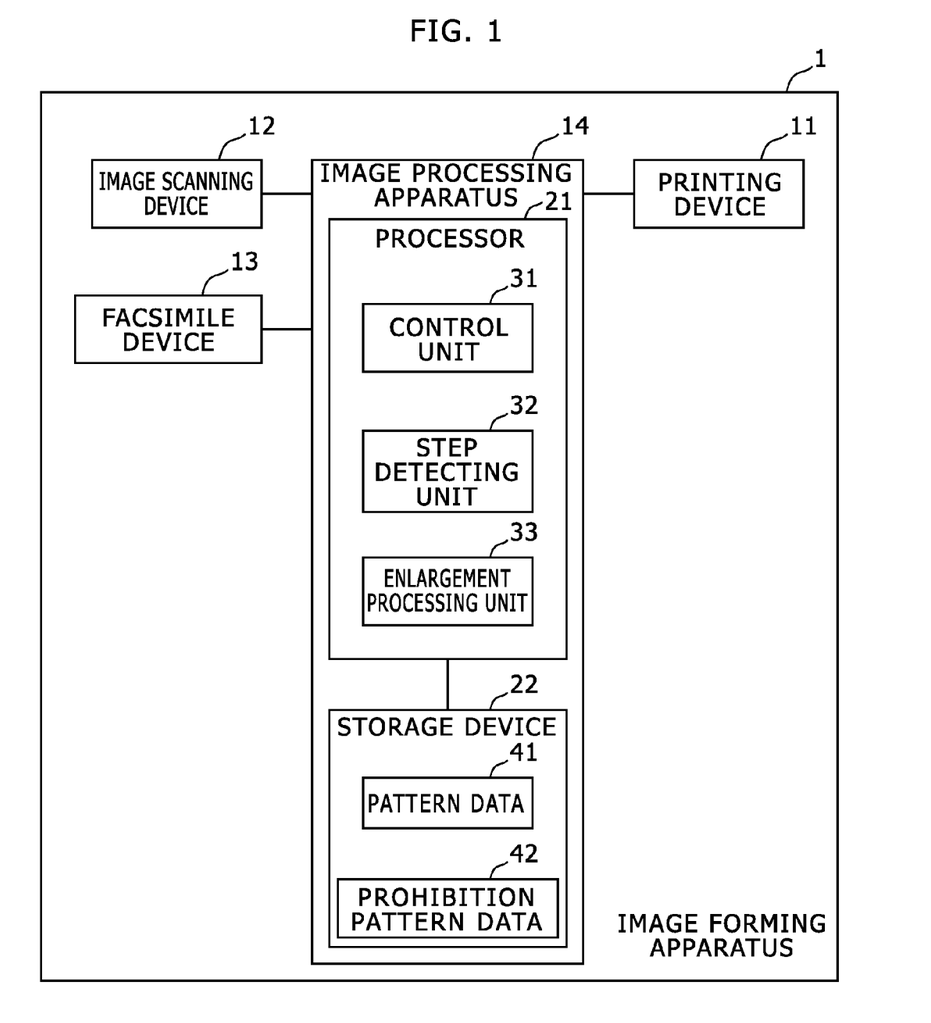
FIG. 1 shows a block diagram which indicates a configuration of an image forming apparatus according to Embodiment 1 of the present disclosure.

FIG. 1 shows a block diagram which indicates a configuration of an image forming apparatus 1 according to Embodiment 1 of the present disclosure. The image forming apparatus 1 shown in FIG. 1 is a multi function peripheral. The image forming apparatus 1 may be a printer, a copier, a facsimile machine, or the like.

This image forming apparatus 1 includes a printing device 11, an image scanning device 12, a facsimile device 13, and an image processing apparatus 14.

The printing device 11 is an internal device which prints a document image based on raster image data. For example, the printing device 11 prints a document image based on image data for which the image processing apparatus 14 has performed an enlargement process.

The image scanning device 12 is an internal device which optically scans a document image of a document and generates image data of the document image.

The facsimile device 13 is an internal device which generates a facsimile signal from image data of a document image to be transmitted and transmits the facsimile signal, and receives a facsimile signal and converts it to image data.

The image processing apparatus 14 performs image processing such as the enlargement process for image data generated by the image scanning device 12, the facsimile device 13 and so forth. In particular, the image processing apparatus 14 enlarges a binary image in a primary scanning direction and/or a secondary scanning direction. It should be noted that the enlargement of an image is the same meaning as increasing image resolution.

In Embodiment 1, the image processing apparatus 14 detects a pixel to be smoothed in an original binary image using pattern matching, and in an enlarged image of the original image, performs smoothing for a pixel area corresponding to the detected pixel.

The image processing apparatus 14 includes a processor 21 and a storage device 22. The processor 21 includes an ASIC (Application Specific Integrated Circuit) and/or a micro computer, and forms processing units. The storage device 22 is a non volatile storage device such as a flash memory.

The storage device 22 has stored pattern data 41 and prohibition pattern data 42 in advance. The pattern data 41 specifies (a) plural pixel value patterns corresponding to step directions and numbers of pixels (hereinafter, called "step length") that have same pixel values and are continuously arranged in line from a first step pixel and a second step pixel in the binary image and (b) one or more pixel positions in which a pixel value is inverted when coinciding with the pixel value pattern. The prohibition pattern data 42 specifies a prohibition pixel value pattern to prohibit inverting the pixel value on each step direction. The first step pixel is a step of a first pixel value (e.g. 1 which indicates black), and the second step pixel is a step of a second pixel value (e.g. 0 which indicates white).

FIGS. 2A to 2D show diagrams which indicate examples of a pixel value pattern and a prohibition pixel value pattern on a step direction in Embodiment 1.

Figure 2A:
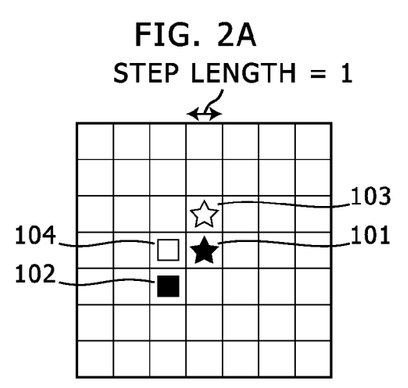
FIGS. 2A to 2D show diagrams which indicate examples of a pixel value pattern and a prohibition pixel value pattern on a step direction in Embodiment 1.
Figure 2B:
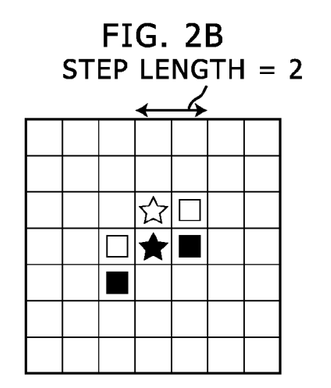
Figure 2C:
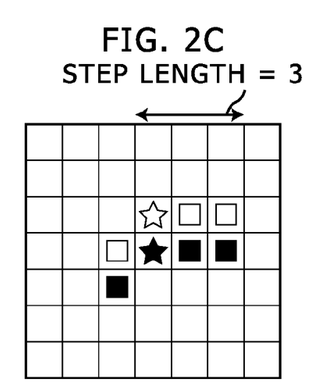
Figure 2D:
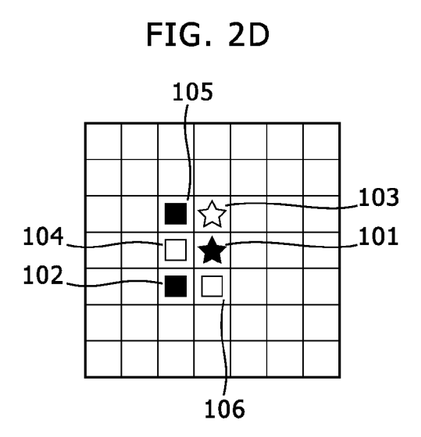

The pixel value patterns and the prohibition pixel value pattern shown in FIGS. 2A to 2D are for an enlargement magnification of 3 times; and the pixel value pattern shown in FIG. 2A is a pixel value pattern of the step length of 1, the pixel value pattern shown in FIG. 2B is a pixel value pattern of the step length of 2, the pixel value pattern shown in FIG. 2C is a pixel value pattern of the step length of 3, and the pixel value pattern shown in FIG. 2D is a prohibition pixel value pattern.

If an enlargement magnification is N, then when an objective pixel is either a first step pixel or a second step pixel, for one step direction, pixel value patterns having step lengths of 1 to N are used.

In FIGS. 2A to 2D, a pixel 101 with a black star mark is an objective pixel, the pixel 101 with a black star mark and pixels 102 with black rectangle mars have same pixel values, a pixel 103 with a white star mark and pixels 104 with white rectangle mark have same pixel values, and the pixel values of the pixels 101 and 102 with respective black star and rectangle marks are different from the pixel values of the pixels 103 and 104 with respective white star and rectangle marks.

If an objective pixel has a pixel value of black, then the pixel value patterns shown in FIGS. 2A to 2D are used as pixel value patterns in which the pixels 101, 102, and 105 with black marks in FIGS. 2A to 2D have pixel values of black and the pixels 103, 104, and 106 with white marks have pixel values of white. Otherwise, if an objective pixel has a pixel value of white, then the pixel value patterns shown in FIGS. 2A to 2D are used as pixel value patterns in which the pixels 101, 102, and 105 with black marks in FIGS. 2A to 2D have pixel values of white and the pixels 103, 104, and 106 with white marks have pixel values of black.

In Embodiment 1, the pixel value patterns in the pattern data 41 includes a basic pixel value pattern. The basic pixel value pattern is a pixel value pattern having a step length of 1 (e.g. the pixel value pattern shown in FIG. 2A).

In the basic pixel value pattern, (a) a pixel value of an objective pixel 101 is equal to a pixel value of a first neighbor pixel 102 obliquely adjacent to the objective pixel 101, (b) a pixel value of a second neighbor pixel 104 adjacent to both of the objective pixel 101 and the first neighbor pixel 102 in either a primary scanning direction or a secondary scanning direction is equal to a pixel value of a third neighbor pixel 103 obliquely adjacent to the second neighbor pixel 104 and adjacent to the objective pixel 101 in either the primary scanning direction or the secondary scanning direction, and (c) the pixel value of the objective pixel 101 is not equal to the pixel value of the third neighbor pixel 103.

The prohibition pixel value pattern includes the basic pixel value pattern. In the prohibition pixel value pattern, (d) a pixel value of a fourth neighbor pixel 105 adjacent to both of the second neighbor pixel 104 and the third neighbor pixel 103 in either the primary scanning direction or the secondary scanning direction is not equal to the pixel value of the second neighbor pixel 104 and the third neighbor pixel 103, and (e) a pixel value of a fifth neighbor pixel 106 adjacent to both of the objective pixel 101 and the first neighbor pixel 102 in either the primary scanning direction or the secondary scanning direction is not equal to the pixel value of the objective pixel 101 and the first neighbor pixel 102. Therefore, as shown in FIG. 2D for example, the prohibition pixel value pattern appears at a crossing part of thin lines, and since smoothing is prohibited there on the basis of the prohibition pixel value pattern, such a crossing part of thin lines are preserved.

Figure 3:
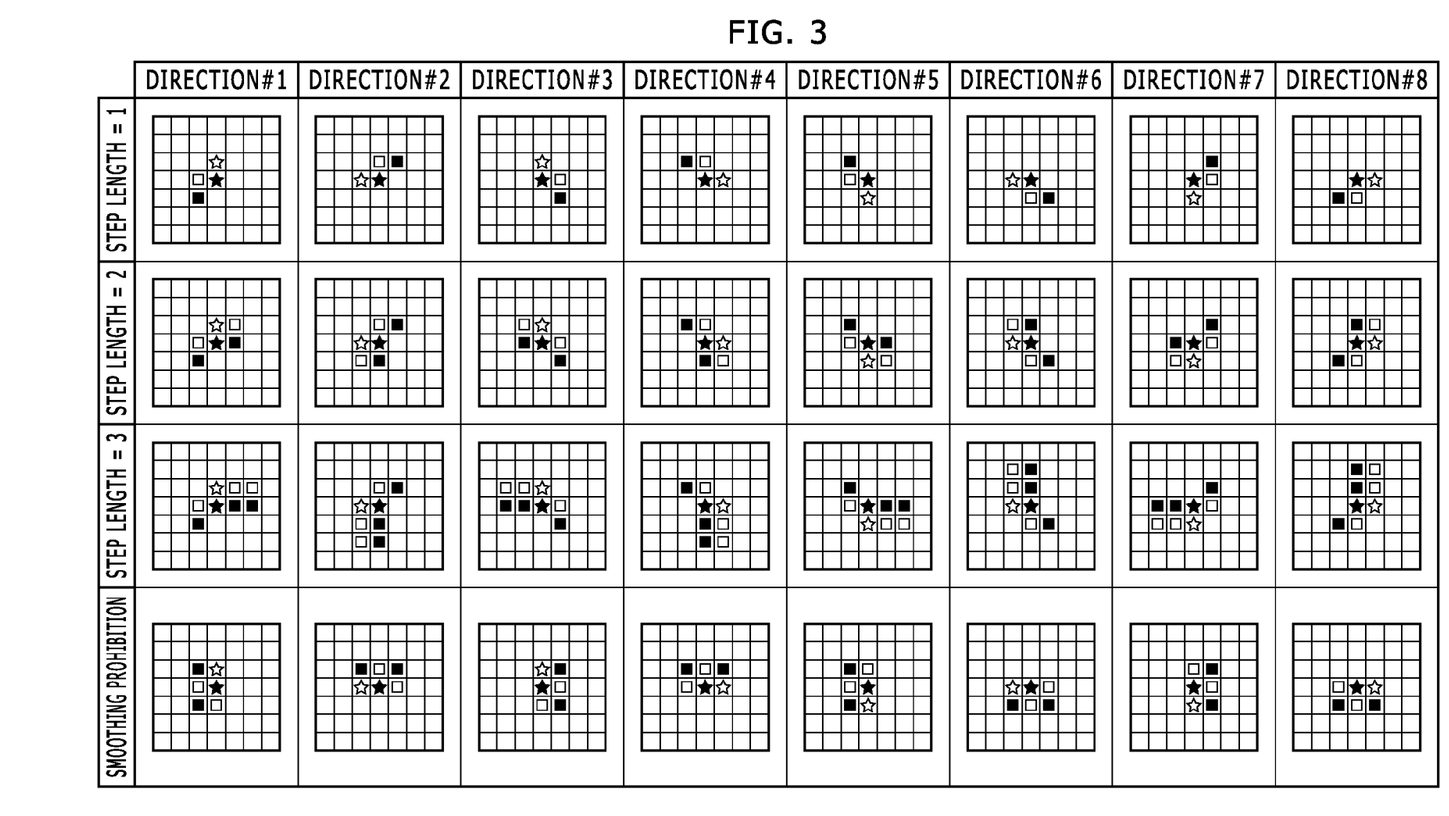
FIG. 3 shows a diagram which indicates examples of a pixel value pattern and a prohibition pixel value pattern on eight Directions #1 to #8 in Embodiment 1.

FIG. 3 shows a diagram which indicates examples of a pixel value pattern and a prohibition pixel value pattern on eight Directions #1 to #8 in Embodiment 1. In FIG. 3, the pixel value patterns and the prohibition pixel value pattern of Direction #1 are the pixel value patterns and the prohibition pixel value pattern shown in FIGS. 2A to 2D. In the pattern matching, it is identified whether or not a pixel value pattern of pixels around an objective pixel is equal to each of these pixel value patterns.

Step lengths of the pixel value pattern of Direction #1, #3, #5, and #7 extend to a primary scanning direction. The step length of Direction #1 extends to a direction different from the direction to which the step length of Direction #3 extends. The step length of Direction #5 extends to a direction different from the direction to which the step length of Direction #7 extends.

Step lengths of the pixel value pattern of Direction #2, #4, #6, and #8 extend to a secondary scanning direction. The step length of Direction #2 extends to a direction different from the direction to which the step length of Direction #6 extends. The step length of Direction #4 extends to a direction different from the direction to which the step length of Direction #8 extends.

Figure 4:
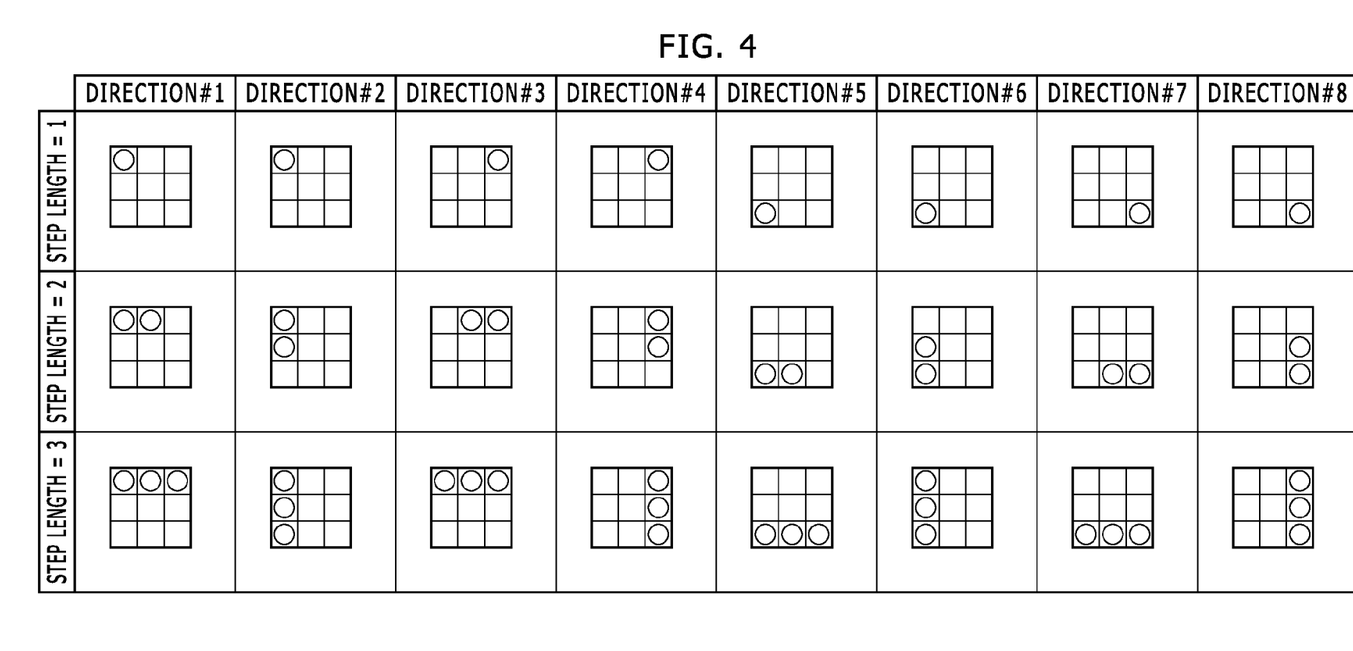
FIG. 4 shows a diagram which indicates a pixel position of which a pixel value is inverted, corresponding to pixel value patterns of the eight directions shown in FIG. 3 and step lengths of 1 to 3.

FIG. 4 shows a diagram which indicates a pixel position of which a pixel value is inverted, corresponding to pixel value patterns of the eight directions shown in FIG. 3 and step lengths of 1 to 3. In FIG. 4, a pixel with a circle mark is a pixel of which a pixel value is inverted.

FIGS. 5A to 5D show diagrams which explain one or more pixel positions at which a pixel value is inverted when coinciding with a pixel value pattern shown in FIGS. 2A to 2D (i.e. a pixel value pattern of the direction #1). The pixel value patterns shown in FIGS. 2A to 2D are for an enlargement magnification of 3 times. Therefore, one pixel in an original binary image corresponds to a pixel area of 3×3 in an enlarged image of it.

Figure 5A:
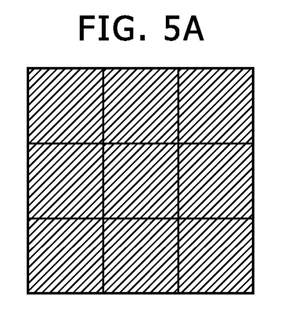
FIGS. 5A to 5E show diagrams which explain one or more pixel positions at which a pixel value is inverted when coinciding with a pixel value pattern.

FIG. 5A indicates pixel values of a pixel area in an enlarged image without coinciding with any of the pixel value patterns. In FIGS. 5A to 5E, a hatched pixel has the same pixel value as a pixel value of an objective pixel in the original binary image.

Figure 5B:
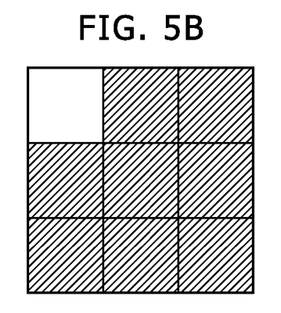

FIG. 5B indicates pixel positions at which pixel values are inverted when a pixel value pattern around the objective pixel 101 coincides with the pixel value pattern shown in FIG. 2A. If a pixel value pattern around the objective pixel 101 coincides with the pixel value pattern with a step length of 1 shown in FIG. 2A, then a pixel value is inverted of one pixel of which the number is same as the step length, and this pixel is one of three pixels on the pixel 103 side in the pixel area.

Figure 5C:
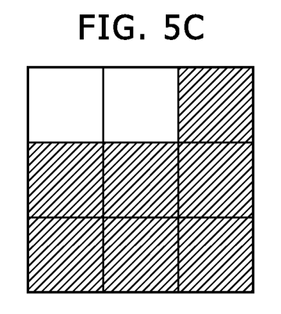

FIG. 5C indicates pixel positions at which pixel values are inverted when a pixel value pattern around the objective pixel 101 coincides with the pixel value pattern shown in FIG. 2B. If a pixel value pattern around the objective pixel 101 coincides with the pixel value pattern with a step length of 2 shown in FIG. 2B, then pixel values are inverted of two pixels of which the number is same as the step length, and these pixels are two of three pixels on the pixel 103 side in the pixel area.

Figure 5D:
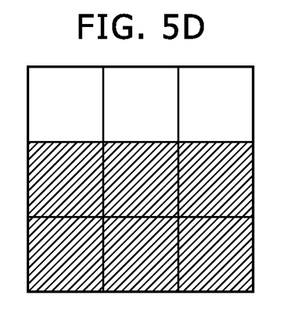

FIG. 5D indicates pixel positions at which pixel values are inverted when a pixel value pattern around the objective pixel 101 coincides with the pixel value pattern shown in FIG. 2C. If a pixel value pattern around the objective pixel 101 coincides with the pixel value pattern with a step length of 3 shown in FIG. 2C, then pixel values are inverted of three pixels of which the number is same as the step length, and these pixels are all of three pixels on the pixel 103 side in the pixel area.

Figure 5E:
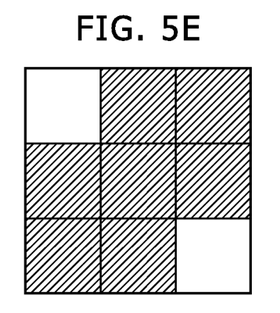

For example, in FIG. 3, If a pixel value pattern around the objective pixel 101 coincides with both of the pixel value pattern of Direction #1 and the step length of 1 and the pixel value pattern of Direction #7 and the step length of 1, then as shown in FIG. 5E, pixel values are inverted at pixel positions corresponding to the respective pixel value patterns.

Further, the processor 21 forms processing units such as a control unit 31, a step detecting unit 32, and an enlargement processing unit 33. The processor 21 includes a memory (not shown), and stores data of a binary image before processing, data of an enlarge image after processing, and so forth in this memory.

The control unit 31 controls the step detecting unit 32 and the enlargement processing unit 33, and scans a pixel in turn along a primary scanning direction and a secondary scanning direction as an objective pixel.

The step detecting unit 32 detects a first step pixel and a second step pixel in the binary image and step directions of the first step pixel and the second step pixel. The first step pixel forms a step of a first pixel value (e.g. 1 which indicates black), and the second step pixel forms a step of a second pixel value (e.g. 0 which indicates white). The second pixel value is an inverted value of the first pixel value.

Here the step means a point at which two edges of either black or white connect with each other with a one-pixel shift in either a horizontal direction (in a primary scanning direction) or a vertical direction (in a secondary scanning direction).

The step detecting unit 32 uses a pixel value pattern in the pattern data 41 for detecting one of the first step pixel and the second step pixel and uses a pixel value pattern generated by inverting this pixel value pattern for detecting the other of the first step pixel and the second step pixel.

The enlargement processing unit 33 performs enlargement of the objective pixel. The enlargement processing unit 33 inverts pixel values of pixels from the first pixel value to the second pixel value in a pixel area corresponding to the first step pixel (e.g. a step pixel of black) in the enlarged image. The pixels of which pixel values are inverted from the first pixel value to the second pixel value are located at positions corresponding to its step direction. The number of the pixels of which pixel values are inverted from the first pixel value to the second pixel value corresponds to its step length. Further, the enlargement processing unit 33 inverts pixel values of pixels from the second pixel value to the first pixel value in a pixel area corresponding to the second step pixel (e.g. a step pixel of white). The pixels of which pixel values are inverted from the second pixel value to the first pixel value are located at positions corresponding to its step direction. The number of the pixels of which pixel values are inverted from the second pixel value to the first pixel value corresponds to its step length.

In Embodiment 1, the step detecting unit 32 performs pattern matching on the basis of the pixel value pattern 41 to detect the first step pixel, its step direction and its step length, and to detect the second step pixel, its step direction and its step length. The enlargement processing unit 33 inverts a pixel value at the pixel position corresponding to the detected pixel value pattern in a pixel area in the enlarged image corresponding to the first step pixel and the second step pixel.

Further, in Embodiment 1, even if either the first step pixel or the second step pixel is detected, the enlargement processing unit 33 does not invert a pixel value at the pixel position corresponding to a step direction, if a pixel value pattern around either the detected first step pixel or the detected second step pixel coincides with the prohibition pixel value pattern corresponding to this step direction of either the detected first step pixel or the detected second step pixel.

The enlargement processing unit 33 inverts a pixel value at all of the pixel positions corresponding to two or more pixel value patterns in a pixel area in the enlarged image corresponding to an objective pixel, if the objective pixel is detected as the first step pixel and/or the second step pixel with all of the two or more pixel value pattern.

Figure 6:
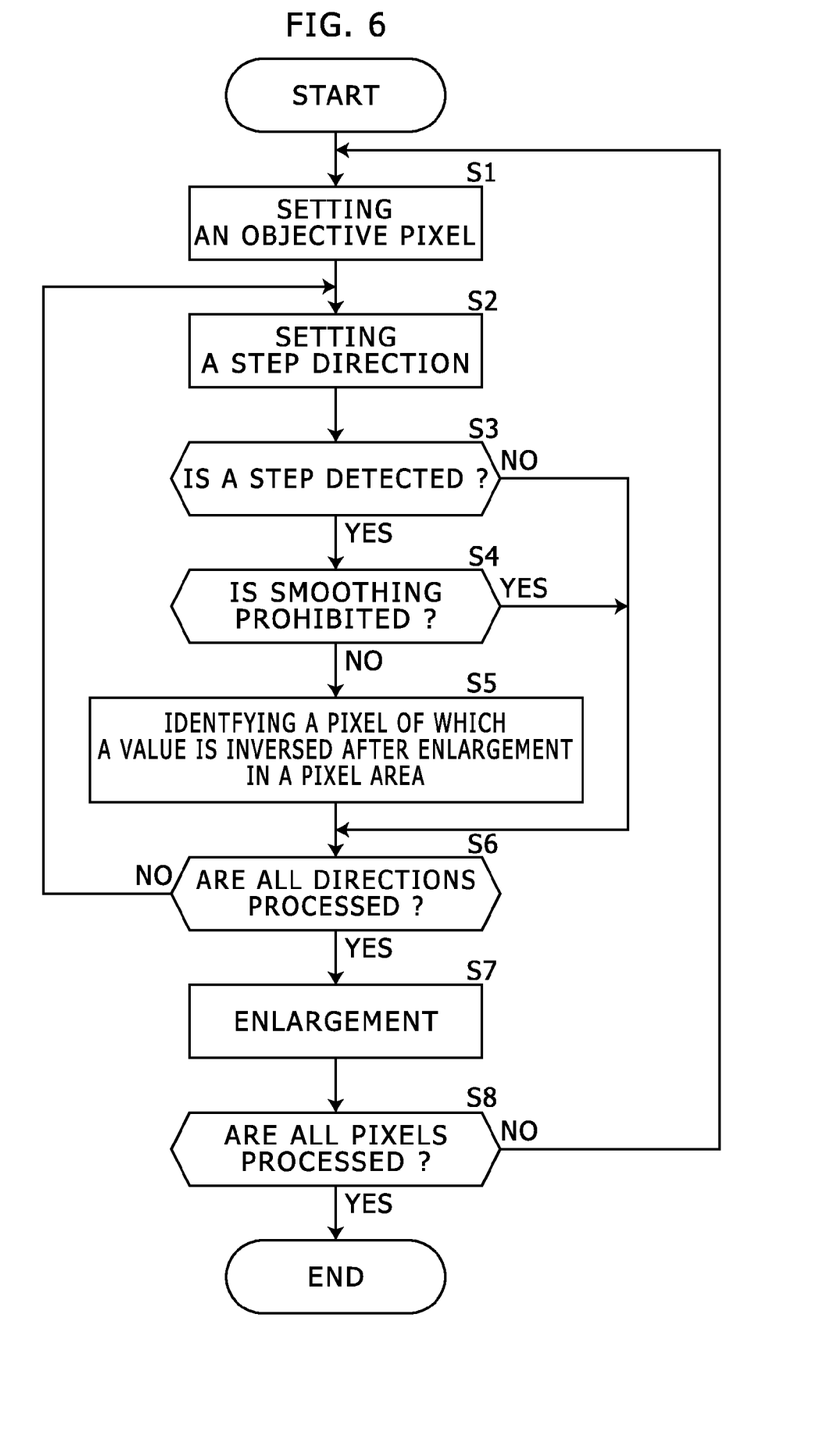
FIG. 6 shows a flowchart which explains a behavior of the image processing apparatus in Embodiment 1.

In the following part, a behavior of the aforementioned image processing apparatus 14 is explained. FIG. 6 shows a flowchart which explains a behavior of the image processing apparatus 14 in Embodiment 1.

Firstly, the control unit 31 sets an objective pixel (Step S1). At first, in the first line, a head pixel in a primary scanning direction is selected as an objective pixel. Subsequently, in the first line, a next pixel in a primary scanning direction is selected as an objective pixel. As a next objective pixel of the last pixel in the primary scanning direction in a line, a head pixel in a primary scanning direction in a next line (e.g. the second line as a next line of the first line) is selected as an objective pixel.

The step detecting unit 32 performs pattern matching for pixel values of pixels around the objective pixel. For example, if the enlargement magnification is 3 times, then this pattern matching uses pixel value patterns of the respective step lengths of 1, 2, and 3 and respective Directions #1 to #8 shown in FIG. 3.

Firstly, the step detecting unit 32 sets a step direction (Step S2). Here, one of Directions #1 to #8 is selected.

Subsequently, the step detecting unit 32 identifies whether or not a pixel value pattern of pixels around the objective pixel coincides with at least one of plural pixel value patterns with the different step lengths (e.g. if the enlargement magnification is 3 times, the step lengths of 1, 2, and 3) on this step direction in the pattern data 41 (Step S3).

If the pixel value pattern of pixels around the objective pixel coincides with at least one of plural pixel value patterns with the different step lengths on this step direction in the pattern data 41, then the step detecting unit 32 identifies whether or not the pixel value pattern of pixels around the objective pixel coincides with a prohibition pixel value pattern of this step direction in the prohibition pattern data 42 (Step S4).

If the pixel value pattern of pixels around the objective pixel does not coincide with a prohibition pixel value pattern of this step direction in the prohibition pattern data 42, then on the basis of the pattern data 41, the step detecting unit 32 identifies pixel positions corresponding to the pixel value pattern coinciding in Step S3 (Step S5).

It should be noted that if the pixel value pattern of pixels around the objective pixel coincides with pixel value patterns with plural step lengths on one step direction, then the step detecting unit 32 identifies pixel positions corresponding to the pixel value pattern with the largest step length among the plural step lengths, and may not identify pixel positions corresponding to the pixel value pattern with the other step lengths among the plural step lengths.

Otherwise, if the pixel value pattern of pixels around the objective pixel does not coincide with any of the plural pixel value patterns with the different step lengths on this step direction in the pattern data 41, and if the pixel value pattern of pixels around the objective pixel coincides with a prohibition pixel value pattern of this step direction in the prohibition pattern data 42, then on this step direction, there are no pixels of which pixel values should be inverted in a pixel area corresponding to the objective pixel after enlargement.

Subsequently, when the process (in Steps S3 to S5) is finished on the step direction set in Step S2, the step detecting unit 32 identifies whether or not on all of Directions #1 to #8, the aforementioned process (in Steps S3 to S5) has been finished (Step S6). If there is at least one step direction which has not been processed, the step detecting unit 32 selects a step direction which has not been processed and performs the aforementioned process (in Steps S3 to S5) on the selected step direction.

As mentioned, on the respective Directions #1 to #8, it is identified whether a step exists or not and whether smoothing is permitted or not, and identified are pixel positions at which pixel values are inverted in a pixel area corresponding to the objective pixel after enlargement.

Subsequently, the enlargement processing unit 33 enlarges the objective pixel (Step S7). In the pixel area after enlargement, the enlargement processing unit 33 sets pixel values on the pixel positions identified in the aforementioned manner as an inverted value of a pixel value of the objective pixel, and sets pixel values on the other pixels as the pixel value of the objective pixel.

When the enlargement process is finished for the objective pixel, the control unit 31 identifies whether or not the objective pixel is the last pixel in the last line (Step S8), and if the objective pixel is not the last pixel in the last line, sets a next objective pixel (Step S1).

Afterward, until the enlargement process is finished in the whole image, the process of Steps S1 to S8 is performed appropriately and repeatedly.

Figure 7A:
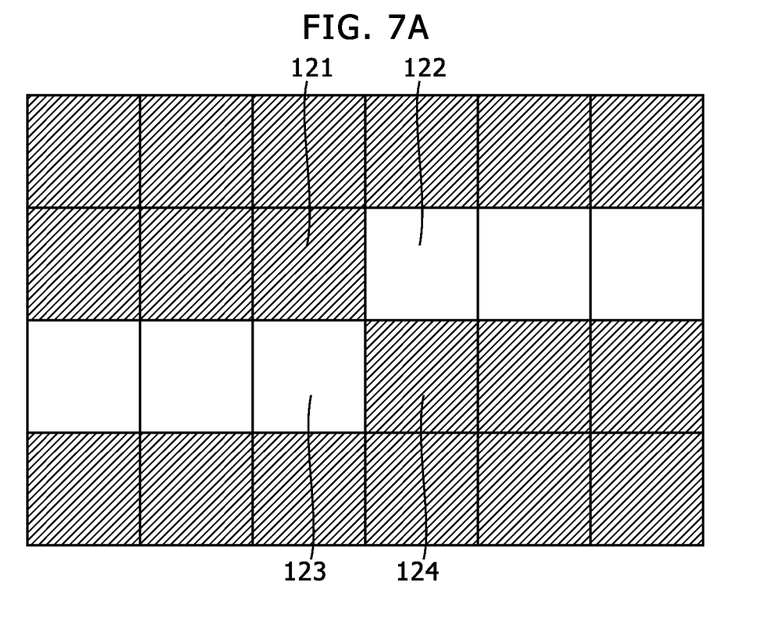
FIG. 7A and FIG. 7B show diagrams which indicate an example of an original binary image and an enlarged image generated from the binary image by the image processing apparatus in Embodiment 1.
Figure 7B:
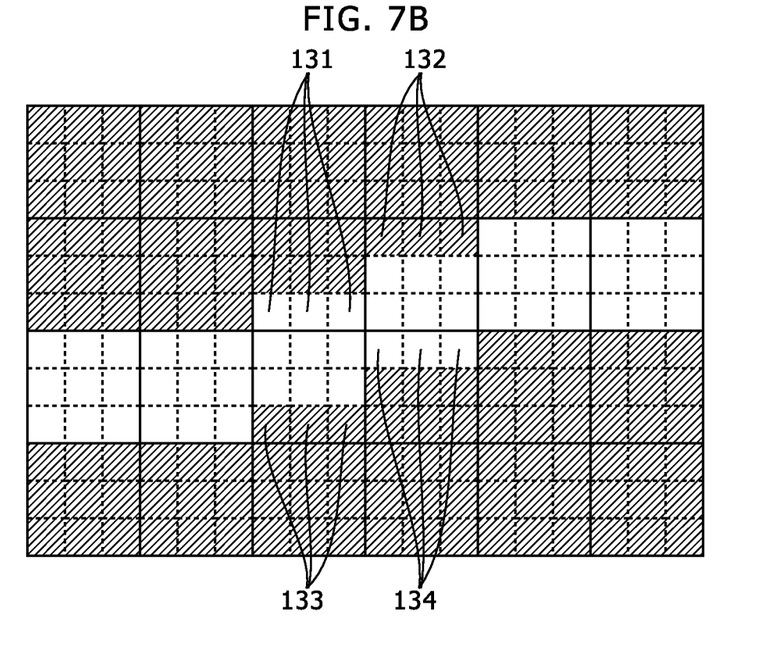

FIG. 7A and FIG. 7B show diagrams which indicate an example of an original binary image and an enlarged image generated from the binary image by the image processing apparatus 14 of Embodiment 1. FIG. 7A shows a diagram which indicates an example of an original binary image (a part) and FIG. 7B shows a diagram which indicates a 3 times enlarged image (a part) generated from the binary image shown in FIG. 7A.

For example, in the binary image shown in FIG. 7A, a neighboring pixel value pattern of a pixel 121 coincides with the pattern of Direction #7 and the step length of 3, a neighboring pixel value pattern of a pixel 122 coincides with the pattern of Direction #1 and the step length of 3, a neighboring pixel value pattern of a pixel 123 coincides with the pattern of Direction #7 and the step length of 3, and a neighboring pixel value pattern of a pixel 124 coincides with the pattern of Direction #1 and the step length of 3.

Therefore, as shown in FIG. 7B, in a pixel area corresponding to the pixel 121, pixel values of three pixels 131 are set as an inverted value of a pixel value of the pixel 121; in a pixel area corresponding to the pixel 122, pixel values of three pixels 132 are set as an inverted value of a pixel value of the pixel 122; in a pixel area corresponding to the pixel 123, pixel values of three pixels 133 are set as an inverted value of a pixel value of the pixel 123; and in a pixel area corresponding to the pixel 124, pixel values of three pixels 134 are set as an inverted value of a pixel value of the pixel 124.

Figure 8A:
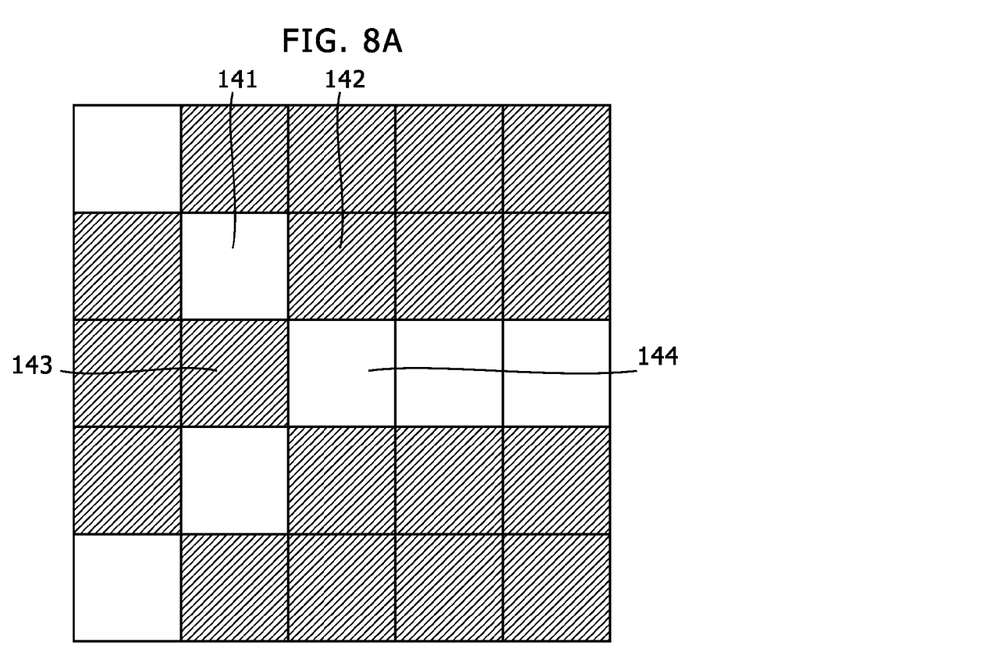
FIG. 8A and FIG. 8B show diagrams which indicate another example of an original binary image and an enlarged image generated from the binary image by the image processing apparatus in Embodiment 1.
Figure 8B:
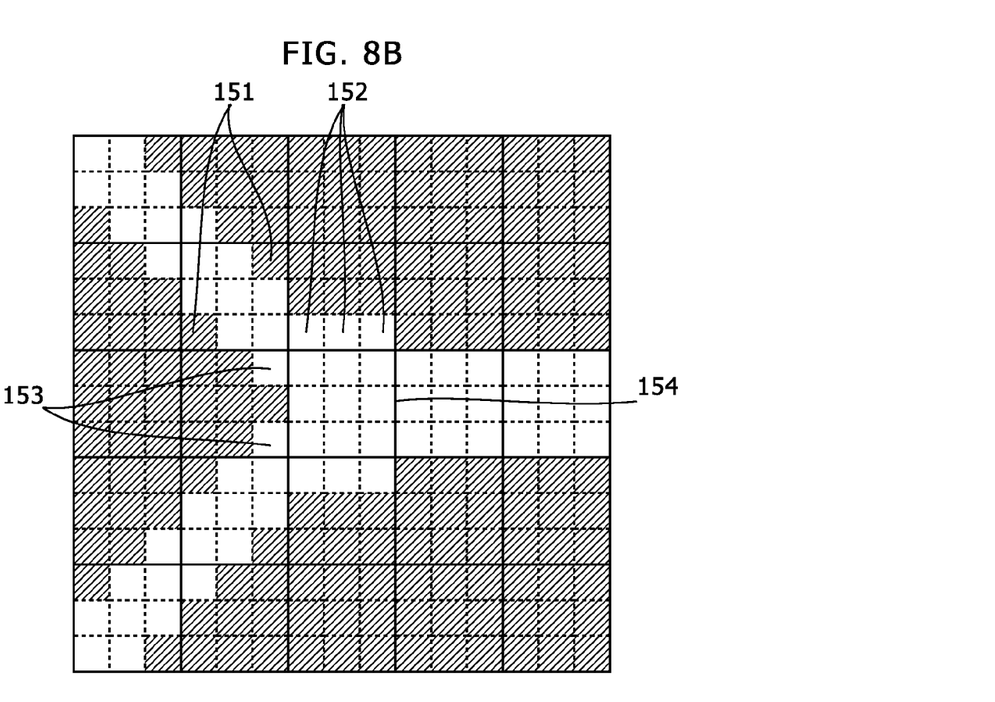

FIG. 8A and FIG. 8B show diagrams which indicate another example of an original binary image and an enlarged image generated from the binary image by the image processing apparatus 14 of Embodiment 1. FIG. 8A shows a diagram which indicates an example of an original binary image (a part) and FIG. 8B shows a diagram which indicates a 3 times enlarged image (a part) generated from the binary image shown in FIG. 8A.

For example, in the binary image shown in FIG. 8A, a neighboring pixel value pattern of a pixel 141 coincides with the pattern of Direction #3 and the step length of 1 and the pattern of Direction #5 and the step length of 1. Therefore, as shown in FIG. 8B, in a pixel area corresponding to the pixel 141, pixel values of two pixels 151 are set as an inverted value of a pixel value of the pixel 141. One of the two pixels 151 is a pixel corresponding to the pattern of Direction #3 and the step length of 1 and the other of the two pixels 151 is a pixel corresponding to the pattern of Direction #5 and the step length of 1.

Further, a neighboring pixel value pattern of a pixel 142 in the original binary image coincides with the pattern of Direction #5 and the step length of 3. Therefore, in a pixel area corresponding to the pixel 142, pixel values of three pixels 152 corresponding to the pattern of Direction #5 and the step length of 3 are set as an inverted value of a pixel value of the pixel 142.

Furthermore, a neighboring pixel value pattern of a pixel 143 in the original binary image coincides with the pattern of Direction #3 and the step length of 1, the pattern of Direction #4 and the step length of 1, the pattern of Direction #7 and the step length of 1, and the pattern of Direction #8 and the step length of 1. However, the neighboring pixel value pattern of the pixel 143 in the original binary image also coincides with the prohibition pixel value patterns of Direction #3 and Direction #7. Therefore, as shown in FIG. 8B, in a pixel area corresponding to the pixel 143, pixel values of only two pixels 153 are set as an inverted value of a pixel value of the pixel 143. One of the two pixels 153 is a pixel corresponding to the pattern of Direction #4 and the step length of 1 and the other of the two pixels 153 is a pixel corresponding to the pattern of Direction #8 and the step length of 1.

Furthermore, a neighboring pixel value pattern of a pixel 144 in the original binary image coincides with the pattern of Direction #1 and the step length of 1, and the pattern of Direction #5 and the step length of 1. However, the neighboring pixel value pattern of the pixel 144 in the original binary image also coincides with the prohibition pixel value patterns of Direction #1 and Direction #5. Therefore, in a pixel area 154 corresponding to the pixel 144, neither inverting pixel values corresponding to the pattern of Direction #1 and the step length of 1 nor inverting pixel values corresponding to the pattern of Direction #5 and the step length of 1 is performed.

Figure 9A:
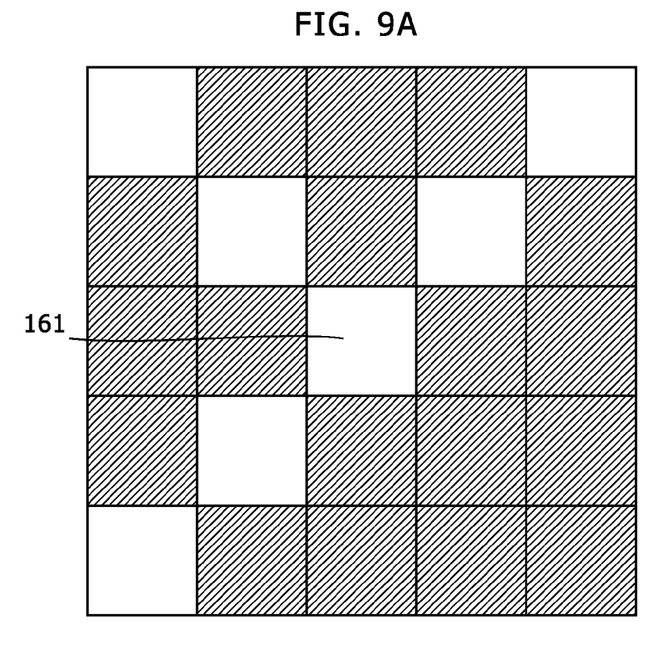
FIG. 9A and FIG. 9B show diagrams which indicate another example of an original binary image and an enlarged image generated from the binary image by the image processing apparatus in Embodiment 1.
Figure 9B:
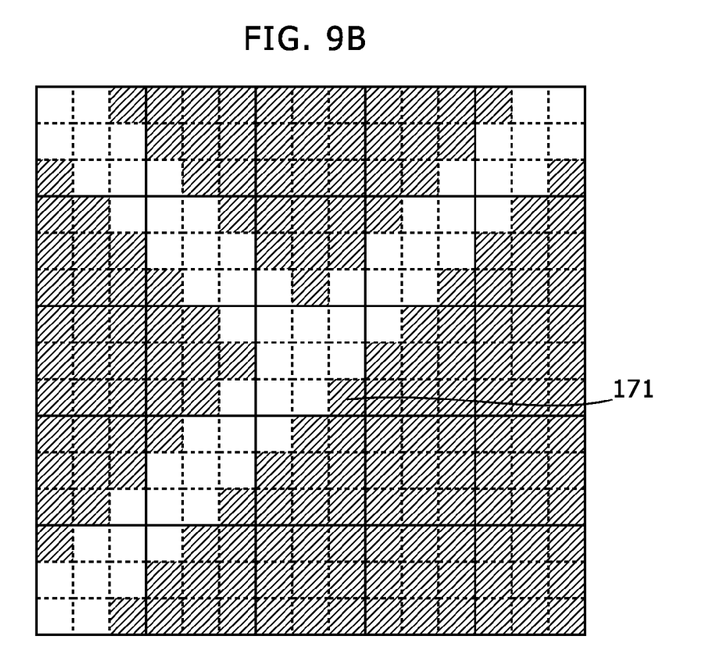

FIG. 9A and FIG. 9B show diagrams which indicate another example of an original binary image and an enlarged image generated from the binary image by the image processing apparatus 14 of Embodiment 1. FIG. 9A shows a diagram which indicates an example of an original binary image (a part) and FIG. 9B shows a diagram which indicates a 3 times enlarged image (a part) generated from the binary image shown in FIG. 9A.

For example, in the binary image shown in FIG. 9A, a neighboring pixel value pattern of a pixel 161 coincides with the pattern of Direction #1 and the step length of 1, the pattern of Direction #2 and the step length of 1, the pattern of Direction #4 and the step length of 1, the pattern of Direction #5 and the step length of 1, the pattern of Direction #7 and the step length of 1, and the pattern of Direction #8 and the step length of 1. However, the neighboring pixel value pattern of the pixel 161 in the original binary image also coincides with the prohibition pixel value patterns of Direction #1, Direction #2, Direction #4, and Direction #5, and therefore, as shown in FIG. 9B, in a pixel area corresponding to the pixel 161, a pixel value of only one pixel 171 is set as an inverted value of a pixel value of the pixel 161. The pixel 171 is a pixel corresponding to the pattern of Direction #7 and the step length of 1 and Direction #8 and the step length of 1.

Figure 10A:
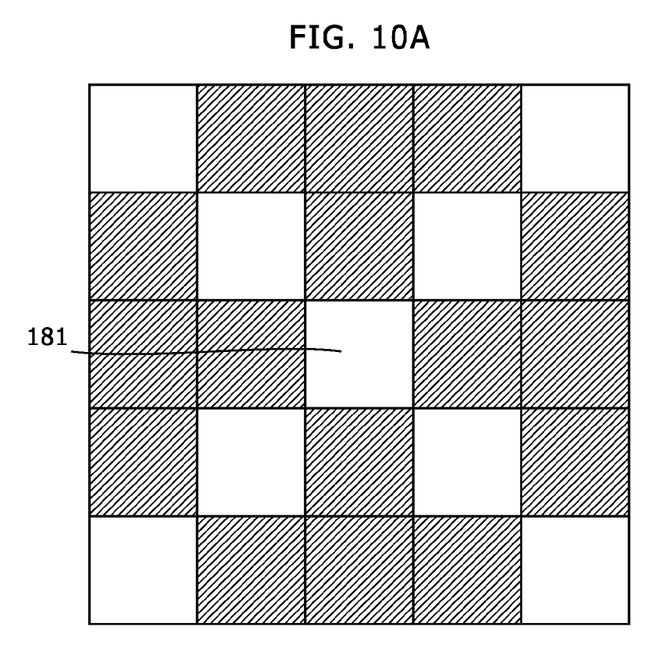
FIG. 10A and FIG. 10B show diagrams which indicate another example of an original binary image and an enlarged image generated from the binary image by the image processing apparatus in Embodiment 1.
Figure 10B:
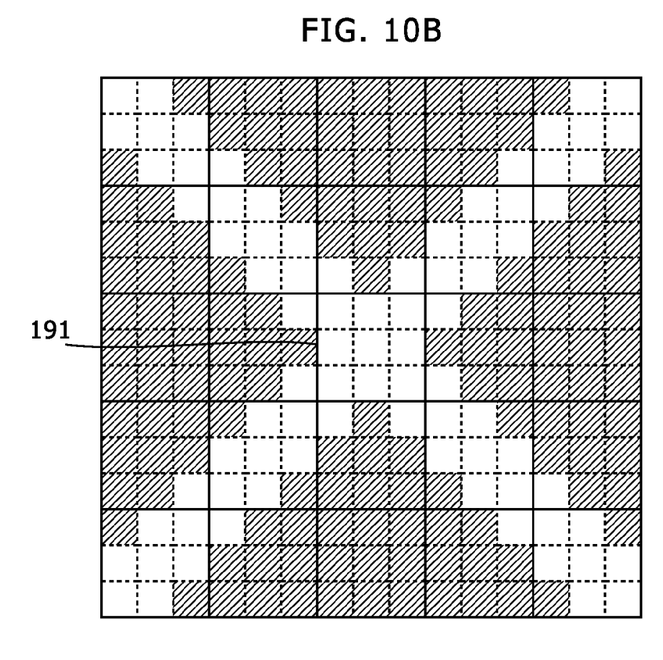

FIG. 10A and FIG. 10B show diagrams which indicate another example of an original binary image and an enlarged image generated from the binary image by the image processing apparatus 14 of Embodiment 1. FIG. 10A shows a diagram which indicates an example of an original binary image (a part) and FIG. 10B shows a diagram which indicates a 3 times enlarged image (a part) generated from the binary image shown in FIG. 8A.

For example, in the binary image shown in FIG. 10A, a neighboring pixel value pattern of a pixel 181 coincides with the pattern of Direction #1 and the step length of 1, the pattern of Direction #2 and the step length of 1, the pattern of Direction #3 and the step length of 1, the pattern of Direction #4 and the step length of 1, the pattern of Direction #5 and the step length of 1, the pattern of Direction #6 and the step length of 1, the pattern of Direction #7 and the step length of 1, and the pattern of Direction #8 and the step length of 1. However, the neighboring pixel value pattern of the pixel 181 in the original binary image also coincides with the prohibition pixel value patterns of Direction #1 to Direction #8. Therefore, as shown in FIG. 10B, in a pixel area 191 corresponding to the pixel 181, no pixel values are inverted.

As mentioned, in Embodiment 1, the step detecting unit 32 detects a first step pixel and a second step pixel in the binary image and step directions of the first step pixel and the second step pixel. The first step pixel forms a step of a first pixel value, and the second step pixel forms a step of a second pixel value that is an inverted value of the first pixel value. The enlargement processing unit 33 inverts pixel values of pixels from the first pixel value to the second pixel value in a pixel area corresponding to the first step pixel in the enlarged image. The pixels of which pixel values are inverted from the first pixel value to the second pixel value are located at positions corresponding to the step direction. The number of the pixels of which pixel values are inverted from the first pixel value to the second pixel value corresponds to its step length. Further, the enlargement processing unit 33 inverts pixel values of pixels from the second pixel value to the first pixel value in a pixel area corresponding to the second step pixel. The pixels of which pixel values are inverted from the second pixel value to the first pixel value are located at positions corresponding to the step direction. The number of the pixels of which pixel values are inverted from the second pixel value to the first pixel value corresponds to its step length.

Therefore, when a binary image is enlarged, smoothing is properly performed for respective ones of both a pixel area with one value among binary values and a pixel area with the other value among binary values.

Embodiment 2

In an image forming apparatus of Embodiment 2 according to the present disclosure, the image processing apparatus 14 uses a permission pixel value pattern to permit inverting a pixel value instead of the prohibition pixel value pattern, and performs smoothing (i.e. inverting a pixel value) only if a pixel value pattern around an objective pixel coincides with the permission pixel value pattern.

In Embodiment 2, in the storage device 22, permission pattern data which specifies a permission pixel value pattern to permit inverting a pixel value on each step direction is stored in advance. Even if either the first step pixel or the second step pixel is detected, the enlargement processing unit 33 does not invert a pixel value in the pixel position corresponding to a step direction, if a pixel value pattern around either the detected first step pixel or the detected second step pixel does not coincide with the permission pixel value pattern corresponding to the step direction of either the detected first step pixel or the detected second step pixel.

Figure 11:
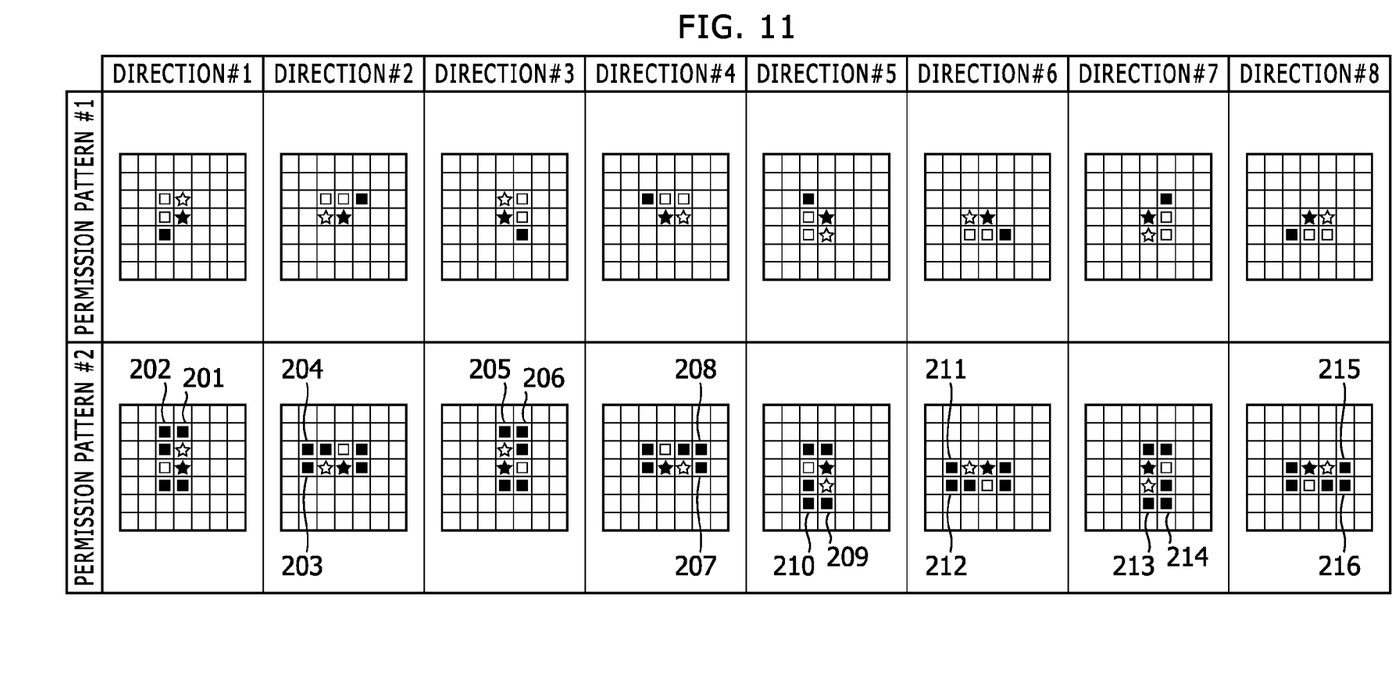
FIG. 11 shows a diagram which indicates permission pixel value patterns corresponding to the pixel value patterns on eight directions #1 to #8 shown in FIG. 3.

FIG. 11 shows a diagram which indicate permission pixel value patterns corresponding to the pixel value patterns on eight Directions #1 to #8 shown in FIG. 3.

As shown in FIG. 11, in Embodiment 2, two permission pixel value patterns are set on each step direction; and a pixel value is inverted only if pixel value pattern around an objective pixel coincides with one of the permission pixel value patterns and coincides with one of the pixel value patterns with the respective step lengths (in FIG. 3).

In Embodiment 2, pixels 201 to 216 in the permission pixel value pattern #2 shown in FIG. 11 are used only if a pixel value of an objective pixel is a value which indicates black. Consequently, a pixel area of black is processed more preferentially than a pixel area of white.

Figure 12A:
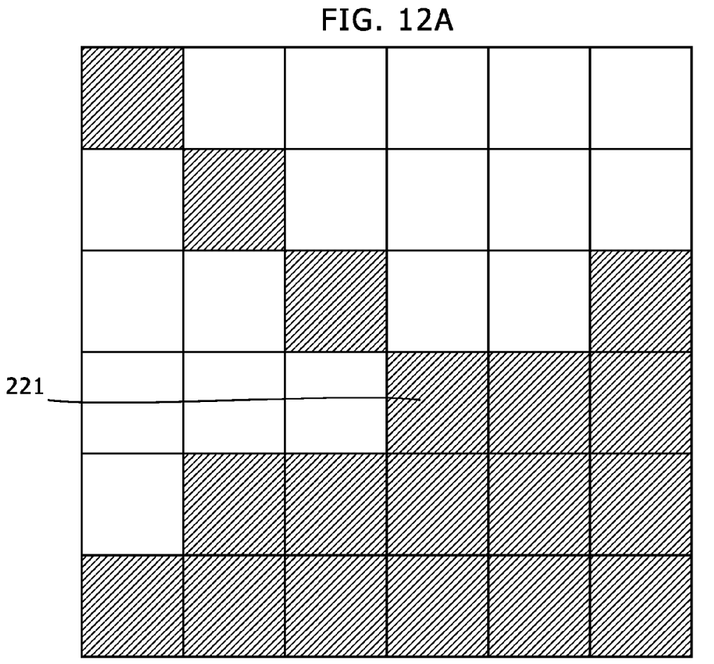
FIG. 12A and FIG. 12B show diagrams which indicate an example of an original binary image and an enlarged image generated from the binary image by an image processing apparatus in Embodiment 2.
Figure 12B:
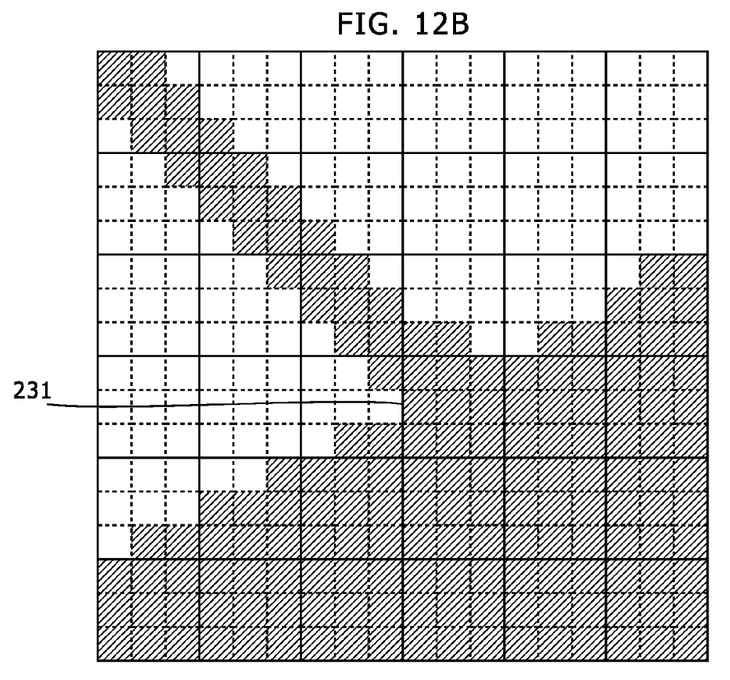

FIG. 12A and FIG. 12B show diagrams which indicate an example of an original binary image and an enlarged image generated from the binary image by an image processing apparatus in Embodiment 2. FIG. 12A shows a diagram which indicates an example of an original binary image (a part) and FIG. 12B shows a diagram which indicates a 3 times enlarged image (a part) generated from the binary image shown in FIG. 12A.

When the permission pixel value patterns shown in FIG. 11 are used, in FIG. 12A and FIG. 12B, no pixel values are inverted in a pixel area 231 corresponding to a pixel at a connecting part of a black thin line, and therefore, the connecting part of a black thin line has favorable image quality.

Other parts of configuration and actions of the image processing apparatus 14 in Embodiment 2 are identical to those in Embodiment 1, and therefore, it is not explained here.

As mentioned, in Embodiment 2, inverting a pixel value on each step direction is permitted on the basis of the permission pixel value pattern, and consequently, in an enlarged image a pixel area corresponding to a step pixel has favorable image quality after smoothing.

The description of the present invention has been presented for purposes of illustration and description, and is not intended to be exhaustive or limited to the invention in the form disclosed.

For example, although the respective embodiments show a case of the enlargement magnification of 3 times, the enlargement magnification is not limited to 3 times. Further, plural sets of pattern data and either prohibition pattern data or permission pattern data corresponding to respective plural enlargement magnifications may be stored in the storage device 22 in advance, and a set of the pattern data and either the prohibition pattern data or the permission pattern data selected by a user for example among the plural sets may be selected and used.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus generating an enlarged image from a binary image with smoothing a neighborhood of a step between two edges, comprising:
   a step detecting unit configured to detect a first step pixel and a second step pixel in the binary image and step directions of the first step pixel and the second step pixel, the first step pixel forming a step of a first pixel value, the second step pixel forming a step of a second pixel value that is an inverted value of the first pixel value; and
   an enlargement processing unit configured to invert pixel values of pixels from the first pixel value to the second pixel value in a pixel area corresponding to the first step pixel in the enlarged image, and invert pixel values of pixels from the second pixel value to the first pixel value in a pixel area corresponding to the second step pixel, the pixels of which pixel values are inverted from the first pixel value to the second pixel value being located at positions corresponding to the step direction, the number of the pixels of which pixel values are inverted from the first pixel value to the second pixel value corresponding to the number of pixels that have same pixel values and are continuously arranged in line from the first pixel value in the binary image, the pixels of which pixel values are inverted from the second pixel value to the first pixel value being located at positions corresponding to the step direction, the number of the pixels of which pixel values are inverted from the second pixel value to the first pixel value corresponding to the number of pixels that have same pixel values and are continuously arranged in line from the second pixel value in the binary image.

2. The image processing apparatus according to claim 1, further comprising:
   pattern data that specifies (a) plural pixel value patterns corresponding to the step direction and the number of pixels that have same pixel values and are continuously arranged in line from the first step pixel and the second step pixel in the binary image and (b) one or more pixel positions at which a pixel value is inverted when coinciding with the pixel value pattern;
   wherein the step detecting unit is further configured to perform pattern matching on the basis of the pixel value pattern to detect the first step pixel, the step direction and the number of pixels that have same pixel values and are continuously arranged in line from the first pixel value, and to detect the second step pixel, the step direction, and the number of pixels that have same pixel values and are continuously arranged in line from the second pixel value; and
   the enlargement processing unit is further configured to invert a pixel value at the pixel position corresponding to the detected pixel value pattern in a pixel area in the enlarged image corresponding to the first step pixel and the second step pixel.

3. The image processing apparatus according to claim 2, further comprising:
   prohibition pattern data that specifies a prohibition pixel value pattern to prohibit inverting the pixel value on each step direction;
   wherein the enlargement processing unit is further configured not to invert a pixel value at the pixel position corresponding to a step direction if a pixel value pattern around either the detected first step pixel or the detected second step pixel coincides with the prohibition pixel value pattern corresponding to the step direction of either the detected first step pixel or the detected second step pixel, even if either the first step pixel or the second step pixel is detected.

4. The image processing apparatus according to claim 3, wherein:
   the pixel value pattern in the pattern data includes a basic pixel value pattern; and in the basic pixel value pattern, (a) a pixel value of an objective pixel is equal to a pixel value of a first neighbor pixel obliquely adjacent to the objective pixel, (b) a pixel value of a second neighbor pixel adjacent to both of the objective pixel and the first neighbor pixel in either a primary scanning direction or a secondary scanning direction is equal to a pixel value of a third neighbor pixel obliquely adjacent to the second neighbor pixel and adjacent to the objective pixel in either the primary scanning direction or the secondary scanning direction, and (c) the pixel value of the objective pixel is not equal to the pixel value of the third neighbor pixel; and in the prohibition pixel value pattern, (d) a pixel value of a fourth neighbor pixel adjacent to both of the second neighbor pixel and the third neighbor pixel in either the primary scanning direction or the secondary scanning direction is not equal to the pixel value of the second neighbor pixel and the third neighbor pixel, and (e) a pixel value of a fifth neighbor pixel adjacent to both of the objective pixel and the first neighbor pixel in either the primary scanning direction or the secondary scanning direction is not equal to the pixel value of the objective pixel and the first neighbor pixel.

5. The image processing apparatus according to claim 2, wherein:

the enlargement processing unit is further configured to invert a pixel value at all of the pixel positions corresponding to two or more pixel value patterns in a pixel area in the enlarged image corresponding to an objective pixel if the objective pixel is detected as the first step pixel and/or the second step pixel with all of the two or more pixel value pattern.

6. The image processing apparatus according to claim 2, wherein:

the step detecting unit is further configured to use an original pixel value pattern for detecting one of the first step pixel and the second step pixel, and use a pixel value generated by inverting the original pixel value pattern for detecting the other of the first step pixel and the second step pixel.

7. The image processing apparatus according to claim 2, further comprising:

permission pattern data that specifies a permission pixel value pattern to permit inverting the pixel value on each step direction;

wherein the enlargement processing unit is further configured not to invert a pixel value in the pixel position corresponding to a step direction if a pixel value pattern around either the detected first step pixel or the detected second step pixel does not coincide with the permission pixel value pattern corresponding to the step direction of either the detected first step pixel or the detected second step pixel, even if either the first step pixel or the second step pixel is detected.

8. An image forming apparatus, comprising:

an image processing apparatus configured to generate an enlarged image from a binary image with smoothing a neighborhood of a step between two edges, wherein the image processing apparatus comprises:

a step detecting unit configured to detect a first step pixel and a second step pixel in the binary image and step directions of the first step pixel and the second step pixel, the first step pixel forming a step of a first pixel value, the second step pixel forming a step of a second pixel value that is an inverted value of the first pixel value; and an enlargement processing unit configured to invert pixel values of pixels from the first pixel value to the second pixel value in a pixel area corresponding to the first step pixel in the enlarged image, and invert pixel values of pixels from the second pixel value to the first pixel value in a pixel area corresponding to the second step pixel, the pixels of which pixel values are inverted from the first pixel value to the second pixel value being located at positions corresponding to the step direction, the number of the pixels of which pixel values are inverted from the first pixel value to the second pixel value corresponding to the number of pixels that have same pixel values and are continuously arranged in line from the first pixel value in the binary image, the pixels of which pixel values are inverted from the second pixel value to the first pixel value being located at positions corresponding to the step direction, the number of the pixels of which pixel values are inverted from the second pixel value to the first pixel value corresponding to the number of pixels that have same pixel values and are continuously arranged in line from the second pixel value in the binary image.

* * * * *